(12) United States Patent
Budan et al.

(10) Patent No.: US 10,386,527 B2
(45) Date of Patent: Aug. 20, 2019

(54) DUAL-GUARD IMAGER PROBE

(71) Applicant: Schlumberger Technology Corporation, Sugar Land, TX (US)

(72) Inventors: Henri Budan, Clamart (FR); Alexandre Abellan, Clamart (FR); Sofiane Ellouz, Clamart (FR); Emmanuel Legendre, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 228 days.

(21) Appl. No.: 15/526,079

(22) PCT Filed: Nov. 23, 2015

(86) PCT No.: PCT/EP2015/002345
§ 371 (c)(1),
(2) Date: May 11, 2017

(87) PCT Pub. No.: WO2016/082925
PCT Pub. Date: Jun. 2, 2016

(65) Prior Publication Data
US 2017/0322335 A1    Nov. 9, 2017

(30) Foreign Application Priority Data
Nov. 27, 2014 (EP) .................................. 14290358

(51) Int. Cl.
*G01V 3/24* (2006.01)

(52) U.S. Cl.
CPC .................................. *G01V 3/24* (2013.01)

(58) Field of Classification Search
USPC .................................................. 324/323–375
See application file for complete search history.

(56) References Cited

U.S. PATENT DOCUMENTS

| 6,373,254 B1* | 4/2002 | Dion | G01V 3/20 |
| | | | 324/369 |
| 2005/0001624 A1* | 1/2005 | Ritter | G01V 3/20 |
| | | | 324/374 |

(Continued)

OTHER PUBLICATIONS

International Preliminary Report on Patentability issued in International Patent Application PCT/EP2015/002345 dated Jun. 3, 2017. 7 pages.

(Continued)

*Primary Examiner* — Tung X Nguyen
*Assistant Examiner* — Robert P Alejnikov, Jr.

(57) ABSTRACT

The present disclosure introduces an apparatus for downhole measurement of a formation resistivity. The apparatus includes a probe having a button electrode, a first guard electrode insulated from the button electrode, a second guard electrode insulated from the first guard electrode, and a return electrode positioned external to the second guard electrode. The apparatus also includes an electrical source for setting a voltage drop between the second guard electrode and the return electrode, a first impedance ($R_{BOG}$) electrically coupled between the button electrode and the second guard electrode, and a second impedance ($R_{IGOG}$) electrically coupled between the first guard electrode and the second guard electrode.

15 Claims, 4 Drawing Sheets

(56) References Cited

U.S. PATENT DOCUMENTS

2006/0238202 A1     10/2006  Gorek et al.
2010/0007349 A1*    1/2010   Gorek ..................... G01V 3/20
                                                         324/373
2013/0013210 A1     1/2013   Itskovich et al.

OTHER PUBLICATIONS

International Search Report and Written Opinion issued in corresponding International Application PCT/EP2015/002345 dated Aug. 2, 2016. 8 pages.
Extended Search Report under Rule 62 EPC issued in corresponding European Application 14290358.2 dated Jun. 5, 2015. 3 pages.

* cited by examiner

DUAL-GUARD IMAGER PROBE

BACKGROUND OF THE DISCLOSURE

In the analysis of a subterranean formation, an imager deployed in a wellbore penetrating the formation may be utilized to obtain an image of the resistivity profile of the formation, such as may range between about one ohm-meter and about 1,000 ohm-meters. For example, the imager may comprise a button electrode and a return electrode and utilize a voltage source coupled to one of the electrodes to inject an excitation voltage $V_E$ into the formation. The resulting current circulating between the electrodes is then measured through a sampling resistor electrically coupled to the voltage source. The measured current provides information indicative of the formation resistivity.

When drilling is performed using oil-based mud (OBM), the imager may measure the formation resistivity through a dielectric fluid, such as oil and/or drilling fluid, which occupies a standoff between electrodes of the OBM imager and the sidewall of the wellbore. Such standoff may range between about three millimeters (mm) and about thirty mm, and makes it more difficult to obtain the formation resistivity accurately. The OBM imager may utilize high frequencies to enhance the accuracy of the measurements.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus operable for downhole measurement of a formation resistivity, wherein the apparatus include a button electrode, a first guard electrode insulated from the button electrode, a second guard electrode insulated from the button and first guard electrodes, and a return electrode positioned external to the second guard electrode. At least the second guard electrode surrounds the button electrode. The apparatus also includes an electrical source for setting a voltage drop between the second guard electrode and the return electrode, a first impedance ($R_{BOG}$) electrically coupled between the button electrode and the second guard electrode, and a second impedance ($R_{IGOG}$) electrically coupled between the first guard electrode and the second guard electrode.

The present disclosure also introduces a method in which a downhole formation resistivity measurement tool is conveyed within a wellbore that extends into a subterranean formation, wherein a probe of the downhole formation resistivity measurement tool includes a button electrode, a first guard electrode insulated from the button electrode, and a second guard electrode insulated from the button and first guard electrodes. The second guard electrode surrounds the button electrode. A return electrode is positioned external to the second guard electrode. The probe also includes an electrical source for setting a voltage drop between the second guard electrode and the return electrode, a first impedance ($R_{BOG}$) electrically coupled between the button electrode and the second guard electrode; and a second impedance ($R_{IGOG}$) electrically coupled between the first guard electrode and the second guard electrode. The method also includes applying a voltage between the second guard electrode and the return electrode via the electrical source, measuring a current circulating through at least one of the first and second impedances, and determining a resistivity of the subterranean formation based on the measured current.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
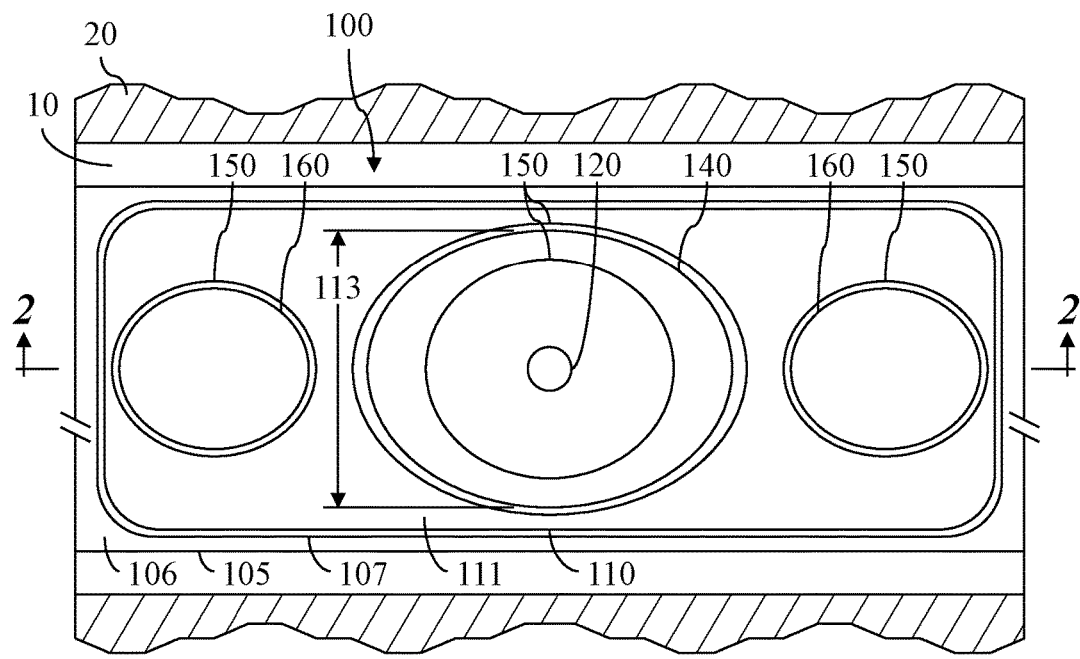
FIG. 1 is a schematic view of at least a portion of a conventional imager tool.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 2:
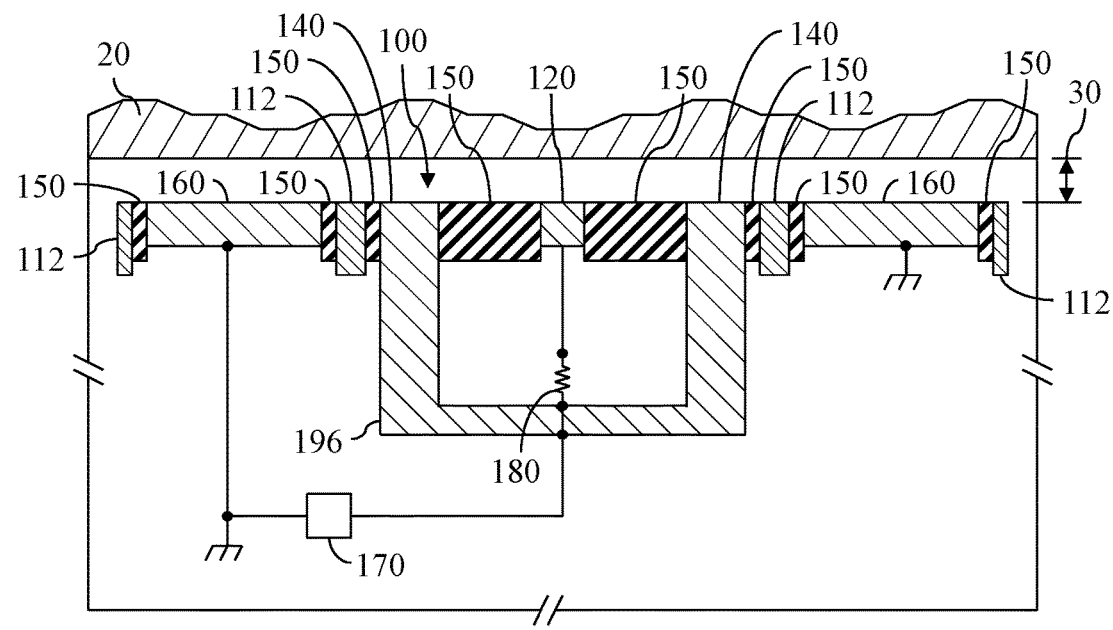
FIG. 2 is a sectional view of the imager tool shown in FIG. 1.

FIG. 1 is a schematic view of a portion of a conventional imager tool 100. FIG. 2 is a sectional view of the imager tool 100 shown in FIG. 1, including the schematic depiction of several electrical components and connections therebetween. The following description refers to FIGS. 1 and 2, collectively.

The imager tool 100 is positioned in a wellbore 10 that extends into a subterranean formation 20 being investigated.

Although not shown for the purpose of clarity, the imager tool 100 is submerged in drilling fluid (e.g., an oil-based drilling fluid, or "mud") within the wellbore 10.

The imager tool 100 comprises or is otherwise carried with a tool collar 105. The imager tool 100 comprises a probe 110 having an exterior surface 111 that may be substantially flush with an exterior surface 106 of the tool collar 105. For example, the probe 110 may be received within a recess or other opening 107 in the exterior surface 106 of the tool collar 105. The probe 110 may be extendable away from the tool collar 105, whether via known or future-developed means. The imager tool 100 may also or instead comprise a back-up piston (not shown) operable to urge the tool collar 105, and thus the probe 110, closer to the formation 20. Extension of the probe 110 and/or the back-up piston away from the tool collar 105 may operatively reduce the standoff 30 (shown in FIG. 2) between the probe 110 and the sidewall of the wellbore 10.

The probe 110 comprises a button electrode 120 and a guard electrode 140 surrounding the button electrode 120. Insulating material 150 electrically isolates the button electrode 120 and the guard electrode 140 from each other and from a body 112 of the probe 110. The probe 110 also comprises one or more return electrodes 160, which are each also isolated from the body 112 of the probe 110 by insulating material 150.

FIG. 2 also schematically depicts electrical components and connections between the elements described above. For example, one side of an excitation voltage source 170 is connected to one of the return electrodes 160 and local circuit ground, with the other side of the excitation voltage source 170 connected to the guard electrode 140. The other one or more return electrodes 160 are also connected to local circuit ground. A sampling resistor 180 having resistance $R_{BG}$ connects the button electrode 120 to the guard electrode 140. The sampling resistor 180 may be positioned in a housing 196, such as may be a distal portion of the guard electrode 140.

As described above, the imager 100 may utilize a high-frequency alternating current (AC) voltage source 170 to apply an excitation voltage $V_E$ between the guard electrode 140 and a return electrode 160, and the resulting button current is measured through the sampling resistor 180 having resistance $R_{BG}$. The high-frequency AC voltage may be produced with a frequency that may exceed 100 kHz (kilohertz), such as about 1 MHz (megahertz) or 10 MHz. From the measured current, the formation resistivity is derived, as well as other data relative to the standoff loss attributable to the standoff. This may be performed via methods known in the art.

As shown in FIGS. 1 and 2, existing imagers generally have a three-electrode architecture, including one or more return electrodes 160, a button electrode 120, and a guard electrode 140. The one or more return electrodes 160 may be utilized for the return current from the button and/or guard electrodes 120, 140, or for the injection current to the button and/or guard electrodes 120, 140. A current $I_B$ flowing through the button electrode 120 is measured, and the guard electrode 140 surrounding but insulated from the button electrode may be utilized to allow the button current $I_B$ to be focalized narrowly on the formation. The current $I_{BR}$ conducted from the button electrode 120 directly to the one or more return electrodes 160 through the drilling fluid but not through the formation, and the current $I_{BG}$ conducted from the button electrode 120 to the guard electrode 140, are also part of the measured current. Thus, when the standoff 30 increases, an excessive portion of current may flow directly to the one or more return electrodes 160 without traveling through the formation 20, thus reducing the accuracy of measurements.

In operation, the current of interest is the current conducted from the button electrode 120 to the one or more return electrodes 160 through the formation 20, or $I_{BFR}$. However, the current $I_{BG}$ conducted from the button electrode 120 to the guard electrode 140 is also of interest, because it indicates poor focalization, such as when the voltage $V_G$ at the guard electrode 140 is substantially different from the voltage $V_B$ at the button electrode 120. Thus, minimizing $I_{BG}$ may be accomplished by minimizing a voltage difference between the button and guard electrodes 120, 140, such that $V_G$ and $V_B$ are substantially similar or equal. This may be achieved by utilizing a resistor connected between the button and guard electrodes 120, 140 and having a low resistance value $R_{BG}$ of the sampling resistor 180.

Obtaining a satisfactory estimation of the resistivity may entail minimizing: (1) the current $I_{BR}$ flowing from the button electrode 120 to the return electrode 160 without passing through the formation; and (2) the current $I_{BG}$ flowing from the button electrode 120 to the guard electrode 140. The current $I_{BR}$ flowing from the button electrode 120 to the return electrode 160 without passing through the formation may be considered as negligible relative to the other currents, but the current $I_{BG}$ flowing from the button electrode 120 to the guard electrode 140 cannot be considered negligible.

The standoff region 30 between the button and guard electrodes 120, 140 may be modeled as a capacitor connected between the button and guard electrodes 120, 140, having a capacitance of $C_{BG}$ and a reactance $X_{BG}=1/(\omega \times C_{BG})$. The voltage $V_{BG}$ between the button electrode 120 and the guard electrode 140 may then be expressed as follows.

For the current flowing through the sampling resistor 180, the voltage $V_{BG}$ may be expressed as set forth below in Equation (1).

$$V_{BG}=R_{BG} \times I_B \qquad (1)$$

For the current flowing through the formation 20, the voltage $V_{BG}$ may be expressed as set forth below in Equation (2).

$$V_{BG}=I_{BG} \times X_{BG} \qquad (2)$$

From Equations (1) and (2), the expression of $R_{BG}$ as a function of the ratio of currents and of the properties of the formation can be derived, as set forth below in Equation (3).

$$R_{BG}=(I_{BG}/I_B) \times X_{BG} \qquad (3)$$

For example, if $C_{BG}$ equals five picofarads, and if the contribution of $I_{BG}$ is maintained below about 0.3%, then the maximum resistance $R_{BG}$ may be estimated as set forth below in Equations (4) and (5).

$$\text{at a } V_E \text{ frequency of 1 MHz, } R_{BG} \approx 0.003/(2\pi \times 10^6 \times 5 \times 10^{-12}) \approx 100 \Omega \qquad (4)$$

$$\text{at a } V_E \text{ frequency of 100 MHz, } R_{BG} \approx 0.003/(2\pi \times 100 \times 10^6 \times 5 \times 10^{-12}) \approx 1 \Omega \qquad (5)$$

With increasing frequency, the value $R_{BG}$ of the sampling resistor 180 diminishes, and the values of the measured parameters permitting the determination of the resistivity of the formation 20, such as the voltage measured across the sampling resistor 180, may be quite low, and the signal-to-noise performance decreases. The available sampling voltage measured across the sampling resistor 180 may then be quite low, especially when the excitation voltage $V_E$ is of a high frequency. Signal-to-noise performance may then be low, such as may be due to thermal noise and crosstalk.

A sampling impedance having a higher resistance may improve focalization, sensitivity, and transfer impedance and crosstalk. With the apparatus and/or methods according to one or more aspects of the disclosure, focalization criteria may be modified by utilizing a double guard electrode architecture. Such an architecture may combine good focalization and good sensitivity and signal-to-noise ratio.

Figure 3:
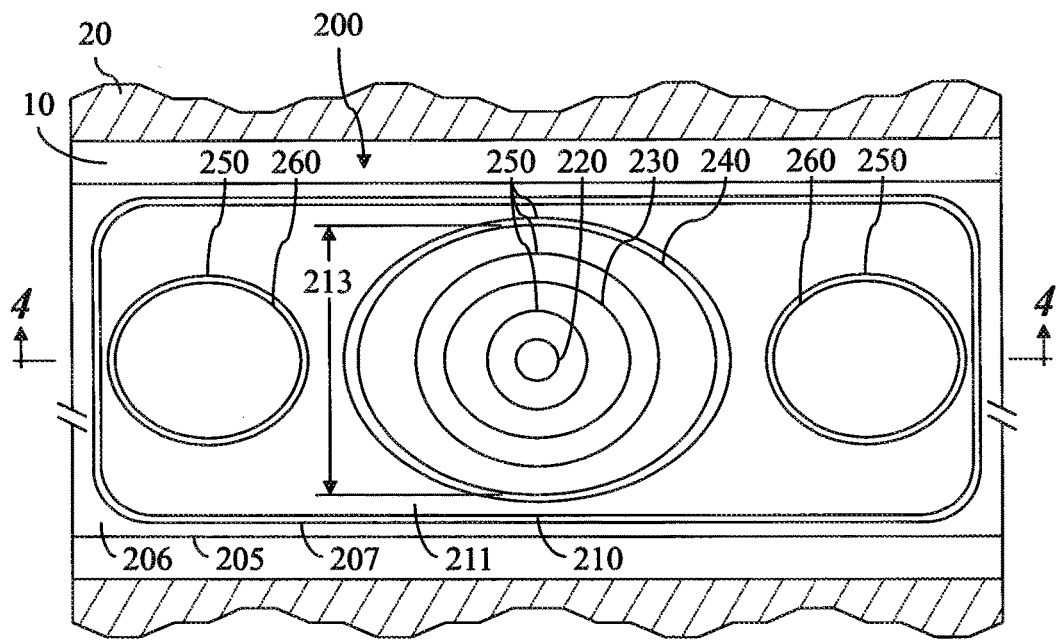
FIG. 3 is a schematic view of at least a portion of an imager tool according to one or more aspects of the present disclosure.
Figure 4:
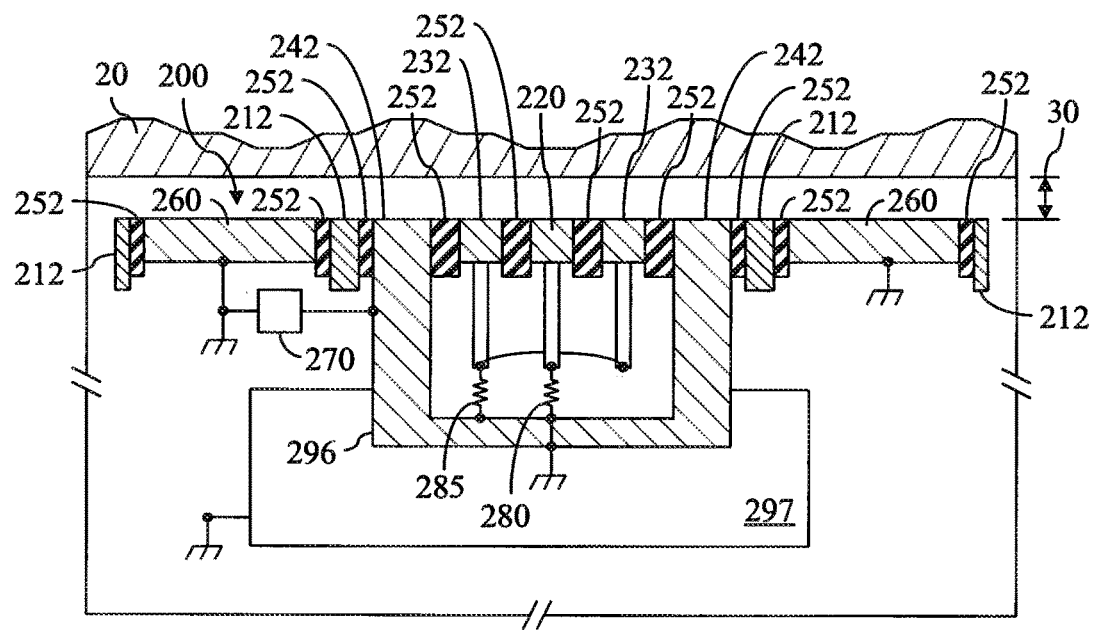
FIG. 4 is a sectional view of the imager tool shown in FIG. 3.

FIG. 3 is a schematic view of a portion of an imager tool 200 according to one or more aspects of the present disclosure. FIG. 4 is a sectional view of the imager tool 200 shown in FIG. 3, including the schematic depiction of several electrical components and connections therebetween. The following description refers to FIGS. 3 and 4, collectively.

The imager tool 200 is positioned in a wellbore 10 that extends into a subterranean formation 20 being investigated. The imager tool 200 may be conveyed within the wellbore 10 via means of conveyance (not shown) such as a drill string, such as in implementations in which the imager tool 200 is part of a logging-while-drilling (LWD) apparatus. Although not shown for the purpose of clarity, the imager tool 200 may be submerged in drilling fluid (e.g., an oil-based drilling fluid, or "mud") within the wellbore 10. However, while one or more aspects of the following description may refer to implementations in which the drilling fluid is an OBM, such aspects may also be applicable or readily adaptable to implementations in which other drilling fluids may be utilized, including water-based mud, among other examples.

The imager tool 200 comprises or is otherwise carried with a tool collar 205. The tool collar 205 generally comprises a tubular member having interfaces (not shown) at one or both ends for coupling with other components of a tool string. The imager tool 200 comprises a probe 210 having an exterior surface 211 that may be substantially flush with an exterior surface 206 of the tool collar 205. For example, the probe 210 may be received within a recess or other opening 207 in the exterior surface 206 of the tool collar 205. The probe 210 may be extendable away from the tool collar 205, whether via known or future-developed means.

The probe 210 comprises a button electrode 220, an inner or first guard electrode 230 surrounding the button electrode 220, and an outer or second guard electrode 240 surrounding the inner guard electrode 230. Insulating material 250 electrically isolates the button electrode 220, the inner guard electrode 230, and the outer guard electrode 240 from each other and from a body 212 of the probe 210. The probe 210 also comprises one or more return electrodes 260, which are each also isolated from the body 212 of the probe 210 by insulating material 250. However, the return electrodes 160 may be formed by at least portions of the tool collar 205 instead of as discrete members carried by the probe 210.

FIG. 4 also schematically depicts electrical components and connections between the elements described above. For example, one side of an excitation voltage source 270 is connected to one of the return electrodes 260 and local circuit ground, with the other side of the excitation voltage source 270 connected to the outer guard electrode 240. The other one or more return electrodes 260 are also connected to local circuit ground. A sampling resistor 280 having resistance $R_{BOG}$ (first impedance) connects the button electrode 220 to the outer guard electrode 240, and an additional resistor 285 having resistance $R_{IGOG}$ (second impedance) connects the inner guard electrode 230 to the outer guard electrode 240. The sampling resistor 280 and the additional resistor 285 may be positioned in a housing 296, such as may be delimited by the outer guard electrode 240.

FIG. 4 also illustrates an acquisition board 297 disposed within the OBM imager tool 200. The housing 296 may contain the acquisition board 297, may be coupled with the acquisition board 297, or may be a distinct component separate from the acquisition board 297 but having one or more electronic components coupled with the acquisition board 297, such as the sampling resistor 280 and/or the additional resistor 285.

Figure 5:
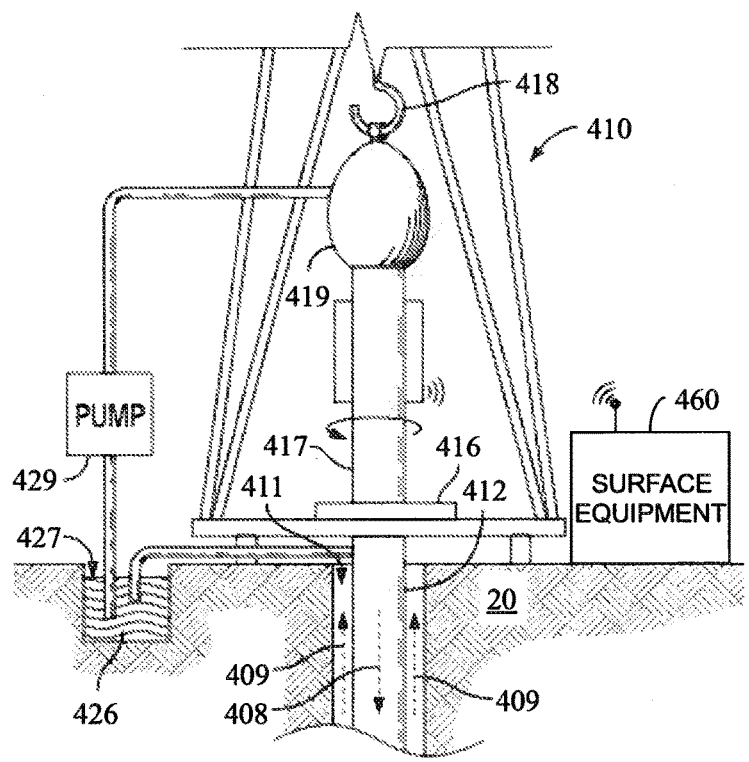
FIG. 5 is a circuit diagram of a simplified capacitive model depicting electrical components of the imager tool shown in FIGS. 3 and 4.
Figure 5:
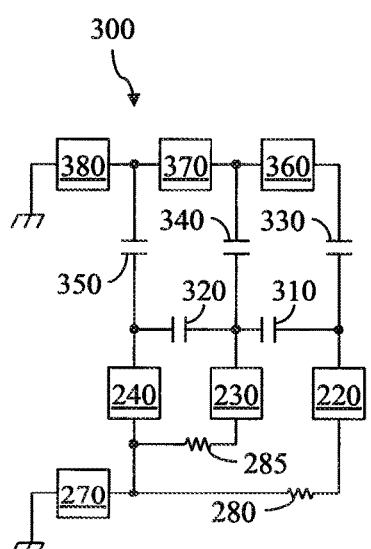

FIG. 5 is a circuit diagram of a simplified capacitive model 300 depicting electrical components described above. In the model 300, the capacitor 310 models capacitance between the button electrode 220 and the inner guard electrode 230, and the capacitor 320 models capacitance between the inner guard electrode 230 and the outer guard electrode 240. The capacitor 330 models capacitance between the button electrode 220 and the formation 20. The capacitor 340 models capacitance between the inner guard electrode 230 and the formation 20, and the capacitor 350 models capacitance between the outer guard electrode 240 and the formation 20. The block 360 models impedance in the formation 20 between the button electrode 220 and the return electrode(s) 160. The block 370 models impedance in the formation 20 between the inner guard electrode 230 and the return electrode(s) 260. The block 380 models impedance in the formation 20 between the outer guard electrode 240 and the return electrode(s) 260. The excitation voltage source 270, the electrodes 220, 230, 240, and the resistors 280, 285 are as described above with reference to FIG. 4.

The following description refers to FIGS. 3-5, collectively.

Optimum focalization of the probe is based on a zero voltage drop between the button electrode 220 and the outer guard electrode 240. In this context, if the voltage $V_{BOG}$ across the sampling resistor 280 is equal to the voltage $V_{IGOG}$ across the additional resistor 285, a voltage differential will not exist between the button electrode 220 and the inner guard electrode 230. This condition is satisfied by Equation (6) as set forth below.

$$R_{BOG} \times I_B = R_{IGOG} \times I_{IG} \quad (6)$$

where $I_B$ is the current conducted through the button electrode 220 and $I_{IG}$ is the current conducted through the inner guard electrode 230.

As a result, a higher value for the resistance $R_{BOG}$ of the sampling resistor 280 may permit a higher measurement signal and/or improved focalization relative to the single-guard architecture described above.

The average ratio β between the current $I_{IG}$ conducted through the inner guard electrode 230 and the current $I_B$ conducted through the button electrode 220 may be expressed as set forth below in Equation (7).

$$\beta = (I_{IG}/I_B)_{average} \approx R_{BOG}/R_{IGOG} \quad (7)$$

The ratio of the current $I_{IG}$ conducted through the inner guard electrode 230 and the current $I_B$ conducted through the button electrode 220 may depend on several factors, including a surface area of the button electrode 220 and the inner guard electrode 230, the focalization achieved by the inner guard electrode 230 relative to the focalization achieved by the outer guard electrode 240, and the formation contrast proximate the button electrode 220 and the inner guard electrode 230. In this context, the impedance $Z_{BF}$ between the button electrode 220 and the formation 20 and the impedance $Z_{IGF}$ between the inner guard electrode 230 and the formation 20 resembles capacitive reactance. Moreover, with respect to average ratio β between the current $I_{IG}$ conducted through the inner guard electrode 230 and the current $I_B$ conducted through the button electrode 220, the standoff 30 loss tangent (tan δ) of both may be assumed to be negligible. Assuming the formation 20 is substantially homogenous proximate the button electrode 220 and the inner guard electrode 230, then the ratio β of the current $I_{IG}$ conducted through the inner guard electrode 230 and the current $I_B$ conducted through the button electrode 220 may be expressed as set forth below in Equation (8).

$$\beta = I_{IG}/I_B = \{[V_{IGF} \times (\omega \times C_{IGF})]/[V_{BF} \times (\omega \times C_{IGF})]\} \quad (8)$$

where $V_{IGF}$ is the voltage between the inner guard electrode 230 and the formation 20, $C_{BF}$ is the capacitance between the button electrode 220 and the formation 20, $V_{BF}$ is the voltage between the button electrode 220 and the formation 20, and $C_{IGF}$ is the equivalent capacitance between the inner guard electrode 230 and the formation 20.

The capacitance $C_{BF}$ between the button electrode 220 and the formation 20 is determined as set forth below in Equation (9).

$$C_{BF} = \varepsilon(S_B/H_S) \quad (9)$$

where ε is the permittivity of the drilling fluid occupying the standoff 30, $S_B$ is the surface area of the button electrode 220, and $H_S$ is the height of the standoff 30. The permittivity ε of the drilling fluid occupying the standoff 30 is determined as set forth below in Equation (10).

$$\varepsilon = \varepsilon_0 \times \varepsilon_r \quad (10)$$

where $\varepsilon_0$ is the permittivity of free space (about $8.8 \times 10^{-12}$ farads/meter) and $\varepsilon_r$ is the relative permittivity of the drilling fluid in the standoff 30. The equivalent capacitance $C_{IGF}$ between the inner guard electrode 230 and the formation 20 is determined as set forth below in Equation (11).

$$C_{IGF} = \varepsilon(S_{IG}/H_S) + \varepsilon[\delta(H_S)] \quad (11)$$

where $S_{IG}$ is the surface area of the inner guard electrode 230 and $\delta(H_S)$ is the border effect capacitance between the inner guard electrode 230 and the outer guard electrode 240.

The voltage $V_{BF}$ between the button electrode 220 and the formation 20 may then be expressed as set forth below in Equation (12).

$$V_{BF} = V_{IGF} - (rb \times I_{BFR}) \quad (12)$$

where rb is the impedance of the formation 20 between the button electrode 220 and the return electrode(s) 260, recalling that $V_{IGF}$ is the voltage between the inner guard electrode 230 and the formation 20 and $I_{BFR}$ is the current conducted from the button electrode 220 to the one or more return electrodes 260 through the formation 20.

However, when the expression $[(rb \times I_{BFR})/V_{BF}]$ is negligible compared to the others, the ratio β of the current $I_{1G}$ conducted through the inner guard electrode 230 and the current $I_B$ conducted through the button electrode 220 may be expressed as set forth below in Equation (13).

$$\beta = I_{IG}/I_B = C_{IGF}/C_{BF} \quad (13)$$

Moreover, the ratio of the equivalent capacitance $C_{IGF}$ (between the inner guard electrode 230 and the formation 20) and the capacitance $C_{BF}$ (between the button electrode 220 and the formation 20) is substantially equivalent to the ratio of the surface area $S_{IG}$ of the inner guard electrode 230 and the surface area $S_B$ of the button electrode 220. Thus, the ratio β of the current $I_{IG}$ conducted through the inner guard electrode 230 and the current $I_B$ conducted through the button electrode 220 may be expressed as set forth below in Equation (14).

$$\beta = R_{BOG}/R_{IGOG} \approx S_{IG}/S_B \quad (14)$$

The surface area $S_{IG}$ of the inner guard electrode 230 may also be referred to herein as the surface area $S_{G1}$ of the first (inner) guard electrode 230.

The resistive value $R_{BOG}$ of the sampling resistor 280 and the resistive value $R_{IGOG}$ of the additional resistor 285 may be defined by consideration of the focalization condition set forth below as expressed above. For example, if the value of $R_{BOG}$ is chosen so that the signal-to-noise performance is acceptable, the value $R_{IGOG}$ may be adapted so that the focalization condition is reached.

The maximum variation of β may be expressed as set forth below in Equation (15).

$$\Delta\beta = (I_{IG}/I_B)_{max} - (I_{IG}/I_B)_{min} \quad (15)$$

The double-guard architecture depicted in FIGS. 3 and 4 may provide optimum performance when Δβ/β, set forth below in Equation (16), is minimum.

$$\Delta\beta/\beta = [(I_{IG}/I_B)_{max} - (I_{IG}/I_B)_{min}]/(I_{IG}/I_B)_{average} \quad (16)$$

For example, if the standoff 30 ranges between about 2.5 mm and about 12.7 mm, the permittivity of the mud ranges between about four and about twenty, and the exterior diameter 213 of the outer guard electrode 240 is about five centimeters (cm), then the performance coefficient Δβ/β may be about 10%. A performance coefficient Δβ/β of about 10% may be at least about ten times better than that with the single-guard architecture described above utilizing a sampling resistor of similar resistance.

The imager tool 200 shown in FIGS. 3-5 may be used for measuring resistivity of the formation 20. During such operations, an alternating current is applied between outer guard electrode 240 and a return electrode 260 via the voltage source 270. The voltage may be a high-frequency voltage, such as a frequency higher than about 100 kHz, or perhaps higher than one MHz, or even ten MHz. Then, the current circulating through the sampling resistor 280 is measured. On the basis of the measured current, the resistivity of the formation 20 may be determined.

The present disclosure also includes implementations other than as depicted in FIGS. 3-5 and/or otherwise described above. For example, the sampling resistor used for measuring current from the formation may be the additional resistor 285 between the inner and outer guard electrodes 230, 240 (second impedance). Furthermore, the inner guard electrode 230 may be connected to the excitation source 270, instead of the outer guard electrode 240 being connected to the excitation source 270. One or more of the first and second impedances described above may be electrical components other than resistors, such as capacitors, for example.

One or both of the resistors 280, 285 may also be a variable resistor whose resistance value may be set depending on, for example, the variation of the p coefficient, which may be measured during operation of the imager tool. Such implementations may improve the focalization by adjusting to the variations occurring in the well. Thus, the probe 220 may include or otherwise implement at least one of the first and second impedances as a variable impedance, such as implementations in which the probe 210 comprises at least one sensor (such as the additional resistor 285) for measuring an electrical parameter relative to the button electrode 220 and/or the inner guard electrode 230, as well as a controller for setting the value of the variable impedance based on the measured electrical parameter. The controller may have one or more functions and/or other aspects in common the processing system 500 shown in FIG. 7 and described below, among other controllers within the scope of the present disclosure. Accordingly, the electrical parameter may comprise at least one of: the voltage drop between the button electrode 220 and inner guard electrode 230; the current circulating between the button electrode 220 and a reference electrode; and the current circulating between the first guard electrode 230 and the reference electrode. In such implementations, the reference electrode may be the outer guard electrode 240 and/or at least one of the return electrodes 260.

Also, the example implementation depicted in FIGS. 3 and 4 depict the inner guard electrode 230 as completely encircling the button electrode 220, and the outer guard electrode 240 as completely encircling the inner guard electrode 230 (and, thus, the button electrode 220). However, the inner guard electrode 230 may not substantially surround the button electrode 220, but may instead partially (e.g., about 75%) surround the button electrode 220, and/or the outer guard electrode 240 may instead partially surround the inner guard electrode 230.

Moreover, the external surface 242 of the outer guard electrode 240 may be disposed around the external surface 232 of the inner guard electrode 230 except for an opening exposing a portion of the external surface 211. For example, the insulating material 250 may not exist, the insulating material 250 (or the external surface 252 thereof) may only partially interpose the external surface 242 of the outer guard electrode 240 and the external surface 232 of the inner guard electrode 230, and/or the insulating material 250 may be recessed beneath the external surface 242 of the outer guard electrode 240 and/or the external surface 232 of the inner guard electrode 230. In a similar context, the return electrode(s) 260 may be formed by corresponding portion(s) of the body 212 of the probe 210, or may be insulated from the body 212 of the probe 210 by the insulating material 250.

Figure 6:
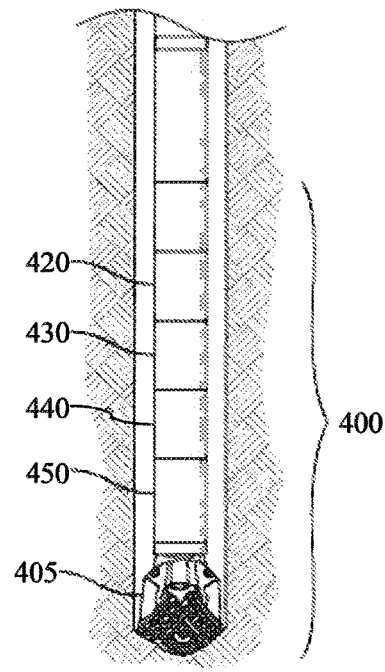
FIG. 6 is a schematic view of an example operating environment in which the imager tool shown in FIGS. 3 and 4 may be utilized.

FIG. 6 is a schematic view of an example operating environment in which the imager tool 200 shown in FIGS. 3-5 may be utilized, including an example wellsite system that can be employed onshore and/or offshore where a borehole 411 may have been formed in one or more subsurface formations 20 by rotary and/or directional drilling. As depicted in FIG. 6, a conveyance means 412 suspended within the borehole 411 may comprise or be connected to a bottom hole assembly (BHA) 400, which may have a drill bit 405 at its lower end. The conveyance means 412 may comprise drill pipe, wired drill pipe (WDP), tough logging conditions (TLC) pipe, coiled tubing, and/or other means of conveying the BHA 400 within the borehole 411.

The surface system at the wellsite may comprise a platform, rig, derrick, and/or other wellsite structure 410 positioned over the borehole 411. The wellsite structure 410 may include a rotary table 416, a kelly 417, a hook 418, and/or a rotary swivel 419. The conveyance means 412 may be rotated by the rotary table 416, energized by means not shown, which may engage the kelly 417 at the upper end of the conveyance means 412. The conveyance means 412 may be suspended from the hook 418, which may be attached to a traveling block (not shown), and through the kelly 417 and the rotary swivel 419, which permits rotation of the conveyance means 412 relative to the hook 418. Additionally, or instead, a top drive system may be used.

The surface system may also include OBM and/or other drilling fluid 426 stored in a pit 427 formed at the wellsite. A pump 429 may deliver the drilling fluid 426 to the interior of the conveyance means 412 via a port (not shown) in the swivel 419, causing the drilling fluid to flow downwardly through the conveyance means 412, as indicated by directional arrow 408. The drilling fluid 426 may exit the conveyance means 412 via ports in the drill bit 405, and then circulate upwardly through the annulus region between the outside of the conveyance means 412 and the wall of the borehole 411, as indicated by directional arrows 409. The drilling fluid 426 may be used to lubricate the drill bit 405 and/or carry formation cuttings up to the surface as it is returned to the pit 427 for recirculation. Although not pictured, one or more other circulation implementations are also within the scope of the present disclosure, such as a reverse circulation implementation in which the drilling fluid 426 is pumped down the annulus region (i.e., opposite to directional arrows 409) to return to the surface within the interior of the conveyance means 412 (i.e., opposite to directional arrow 408).

The BHA 400 may include various numbers and/or types of downhole tools, schematically depicted in FIG. 6 as downhole tools 420, 430, 440, and 450. One or more of the downhole tools 420, 430, 440, 450 may be or comprise an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other downhole tools are also within the scope of the present disclosure. One or more of the downhole tools 420, 430, 440, 450 may be an imager tool according to one or more aspects of the present disclosure, such as the imager tool 200 shown in FIGS. 3-5, and/or may be utilized to perform at least a portion of a method according to one or more aspects of the present disclosure.

The downhole tools 420, 430, 440, and/or 450 may be housed in a special type of drill collar, as it is known in the art, and may include capabilities for measuring, processing, and/or storing information, as well as for communicating with the other downhole tools 420, 430, 440, and/or 450, and/or directly with a logging and control system and/or other surface equipment 460. Such communication may utilize one or more conventional and/or future-developed two-way telemetry systems, such as may be or comprise a mud-pulse telemetry system, a wired drill pipe telemetry system, an electromagnetic telemetry system, and/or an acoustic telemetry system, among others within the scope of the present disclosure. One or more of the downhole tools 420, 430, 440, and/or 450 may also comprise an apparatus (not shown) for generating electrical power for use by the BHA 400. Example devices to generate electrical power include, but are not limited to, a battery system and a mud turbine generator powered by the flow of the drilling fluid.

Figure 7:
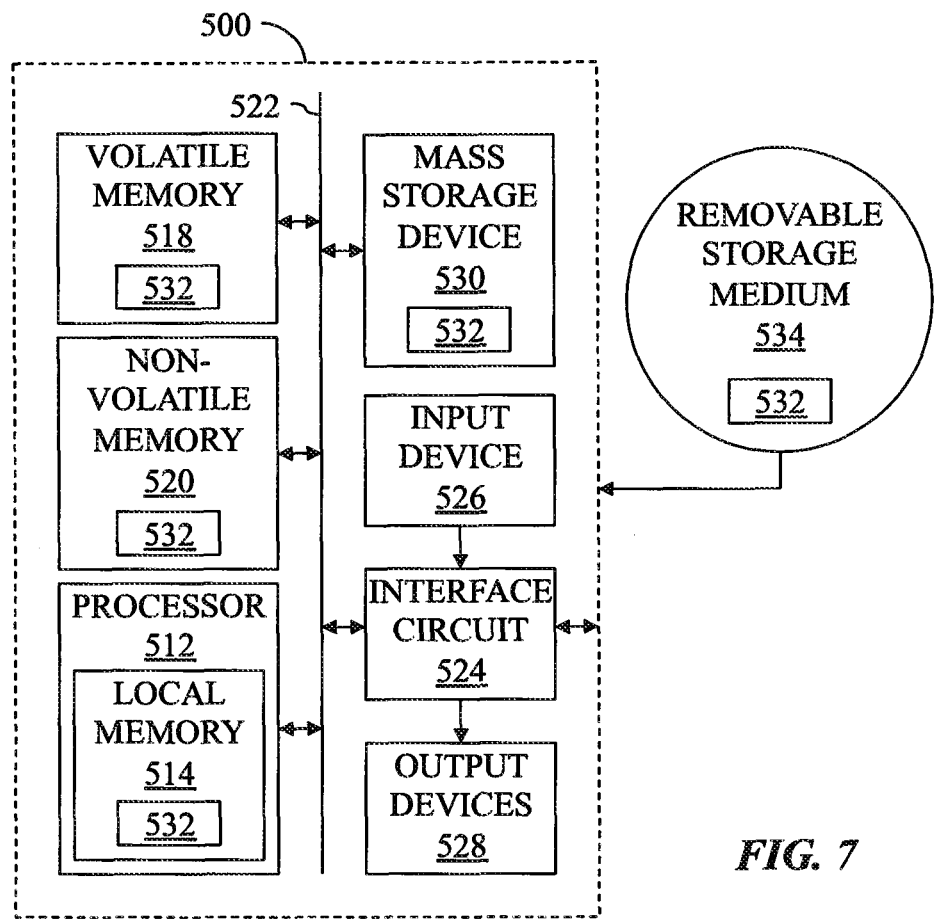
FIG. 7 is a schematic view of at least a portion of apparatus according to one or more aspects of the present disclosure.

FIG. 7 is a schematic view of at least a portion of apparatus according to one or more aspects of the present disclosure. The apparatus is or comprises a processing system 500 that may execute example machine-readable instructions to implement at least a portion of one or more of the methods and/or processes described herein, and/or to implement a portion of one or more of the example downhole tools described herein. The processing system 500 may be or comprise, for example, one or more processors, controllers, special-purpose computing devices, servers, personal computers, personal digital assistant ("PDA") devices, smartphones, internet appliances, and/or other types of computing devices. Moreover, while it is possible that the entirety of the processing system 500 shown in FIG. 7 is implemented within downhole apparatus, such as the imager tool 200 shown in one or more of FIGS. 3-5, one or more of the downhole tools 420, 430, 440, and/or 450 shown in FIG. 6, and/or other downhole apparatus, it is also contemplated that one or more components or functions of the processing system 500 may be implemented in wellsite surface equipment, perhaps including the surface equipment 460 depicted in FIG. 6 and/or other surface equipment.

The processing system 500 may comprise a processor 512 such as, for example, a general-purpose programmable processor. The processor 512 may comprise a local memory 514, and may execute coded instructions 532 present in the local memory 514 and/or another memory device. The processor 512 may execute, among other things, machine-readable instructions or programs to implement the methods and/or processes described herein. The programs stored in the local memory 514 may include program instructions or computer program code that, when executed by an associated processor, enable surface equipment and/or downhole controller and/or control system to perform tasks as described herein. The processor 512 may be, comprise, or be implemented by one or a plurality of processors of various types suitable to the local application environment, and may include one or more of general-purpose computers, special-purpose computers, microprocessors, digital signal processors ("DSPs"), field-programmable gate arrays ("FPGAs"), application-specific integrated circuits ("ASICs"), and processors based on a multi-core processor architecture, as non-limiting examples. Of course, other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 520 may be, comprise, or be implemented by read-only memory, flash memory and/or other types of memory devices. One or more memory controllers (not shown) may control access to the volatile memory 518 and/or the non-volatile memory 520.

The processing system 500 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, and/or a cellular interface, among others. The interface circuit 524 may also comprise a graphics driver card. The interface circuit 524 may also comprise a communication device such as a modem or network interface card to facilitate exchange of data with external computing devices via a network (e.g., Ethernet connection, digital subscriber line ("DSL"), telephone line, coaxial cable, cellular telephone system, satellite, etc.).

One or more input devices 526 may be connected to the interface circuit 524. The input device(s) 526 may permit a user to enter data and commands into the processor 512. The input device(s) 526 may be, comprise, or be implemented by, for example, a keyboard, a mouse, a touchscreen, a track-pad, a trackball, an isopoint, and/or a voice recognition system, among others.

One or more output devices 528 may also be connected to the interface circuit 524. The output devices 528 may be, comprise, or be implemented by, for example, display devices (e.g., a liquid crystal display or cathode ray tube display (CRT), among others), printers, and/or speakers, among others.

The processing system 500 may also comprise one or more mass storage devices 530 for storing machine-readable instructions and data. Examples of such mass storage devices 530 include floppy disk drives, hard drive disks, compact disk (CD) drives, and digital versatile disk (DVD) drives, among others. The coded instructions 532 may be stored in the mass storage device 530, the volatile memory 518, the non-volatile memory 520, the local memory 514, and/or on a removable storage medium 534, such as a CD or DVD. Thus, the modules and/or other components of the processing system 500 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

Figure 8:
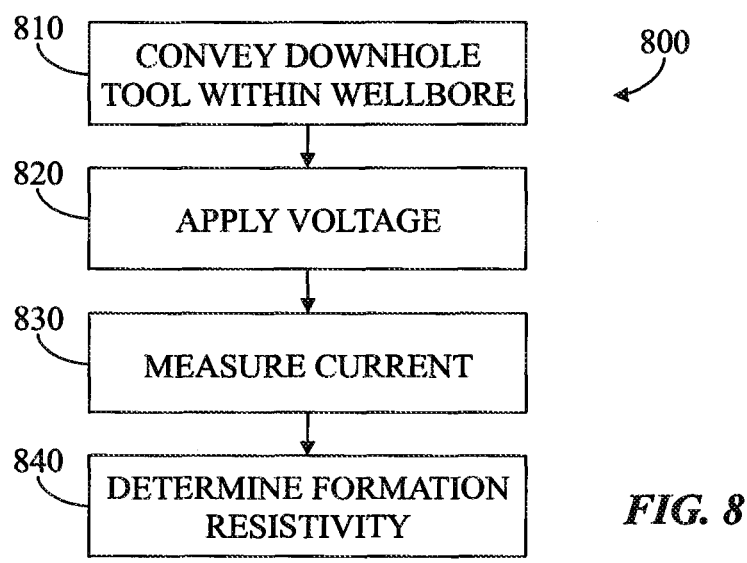
FIG. 8 is a flow-chart diagram of at least a portion of a method according to one or more aspects of the present disclosure.

FIG. 8 is a flow-chart diagram of at least a portion of a method (800) according to one or more aspects of the present disclosure. The method (800) may be performed utilizing aspects having one or more aspects in common with at least a portion of the apparatus depicted in one or more of FIGS. 3-7 and/or as otherwise described above.

The method (800) comprises conveying (810) a downhole tool, such as a downhole formation resistivity measurement tool and/or downhole imager tool, within a wellbore that extends into a subterranean formation. At least a portion of the downhole tool may be, or be substantially similar to, the probe 200 shown in FIGS. 3 and 4, the circuit 300 shown in FIG. 5, one or more of the downhole tools 420, 430, 440, 450 shown in FIG. 6, the processing system 500 shown in FIG. 7, and/or portions thereof. The downhole tool may also be in communication with various surface equipment, such as the surface equipment 460 shown in FIG. 6.

For example, as shown in FIGS. 3 and 4, the tool may comprise a probe (e.g., the probe 210) that comprises a button electrode (e.g., the button electrode 220), a first guard electrode (e.g., the inner guard electrode 230) insulated from the button electrode 220, a second guard electrode (e.g., the outer guard electrode 240) insulated from the button and first guard electrodes (such as where the outer guard electrode 240 surrounds the button electrode 220 and/or the inner guard electrode 230), and a return electrode (e.g., one or both of the return electrodes 260) positioned external to the second guard electrode. The probe or other portion of the downhole tool may also comprise an electrical source (e.g., the voltage source 270) for setting a voltage drop between the second guard electrode and the return electrode, a first impedance ($R_{BOG}$, such as of the sampling resistor 280) electrically coupled between the button electrode and the second guard electrode, and a second impedance ($R_{IGOG}$, such as of the additional resistor 285) electrically coupled between the first and second guard electrodes. As described above, such as in association with one or more of Equations (1)-(16), the first and second impedances may be selected to minimize a voltage difference between the button electrode and the first guard electrode.

In the description above, the first guard electrode corresponds to the inner guard electrode 230, and the second guard electrode corresponds to the outer guard electrode 240. However, in other implementations within the scope of the present disclosure, the first guard electrode may correspond to the outer guard electrode 240, and the second guard electrode may correspond to the inner guard electrode 230.

The probe 210 shown in FIGS. 3 and 4 provide an example of at least a portion of apparatus that may be utilized to perform at least a portion of the method (800) shown in FIG. 8. Thus, the following description refers to FIGS. 3, 4, and 8, collectively. However, other implementations of the method (800) within the scope of the present disclosure may also or instead be performed utilizing a downhole tool comprising a probe other than the probe 200 shown in FIGS. 3 and 4.

The method (800) also comprises applying (820) a voltage between the second guard electrode and the return electrode via the electrical source. For example, the applied (820) voltage may be a high-frequency AC voltage produced with a frequency that may exceed 100 kHz, such as about 1 MHz, 10 MHz, or higher.

The method (800) also comprises measuring (830) a current circulating through at least one of the first and second impedances, such as a current circulating through at least one of the sampling resistor 280 and/or the additional resistor 285. The method (800) also comprises determining (840) a resistivity of the subterranean formation based on the measured (830) current, such as may be in association with the principles described above with respect to one or more of Equations (1)-(16). However, one or more aspects of determining (840) the resistivity of the subterranean formation based on the measured (830) current may be associated with known or future-developed practices.

In view of the entirety of the present disclosure, a person having ordinary skill in the art will readily recognize that the present disclosure introduces an apparatus operable for downhole measurement of a formation resistivity, wherein the apparatus comprises: a button electrode; a first guard electrode insulated from the button electrode; a second guard electrode insulated from the button and first guard electrodes; and a return electrode positioned external to the second guard electrode; wherein at least the second guard electrode surrounds the button electrode; and wherein the apparatus further comprises: an electrical source for setting a voltage drop between the second guard electrode and the return electrode; a first impedance ($R_{BOG}$) electrically coupled between the button electrode and the second guard electrode; and a second impedance ($R_{IGOG}$) electrically coupled between the first guard electrode and the second guard electrode. The first and second guard electrodes may be concentrically surrounding the button electrode. The first guard electrode may be an inner or outer guard electrode, and the second guard electrode may be an outer or inner guard electrode. The first and second impedances may be selected to minimize a voltage difference between the button electrode and the first guard electrode. The button electrode, the first guard electrode, the second guard electrode, and the return electrode may be positioned on a common external surface of the apparatus. A ratio of values of the first and second impedances may be selected so that ($R_{BOG}/R_{IGOG}$) $\approx (S_{G1}/S_B)$, wherein $S_{G1}$ and $S_B$ are respective external surface areas of the first guard and button electrodes.

At least one of the first and second impedances may be a variable impedance, and the apparatus may further comprise: at least one sensor for measuring an electrical parameter relative to the button electrode and/or the first guard electrode; and a controller for setting the value of the variable impedance based on the measured electrical parameter. The electrical parameter may comprise at least one of: the voltage drop between the button electrode and first guard electrode; and currents circulating between the button electrode and a reference electrode and between the first guard electrode and the reference electrode, the reference electrode being one of the second guard electrode and the return electrode. The variable impedance may be the second impedance.

The first and second impedance may be resistances. They also may be capacitors or any other combinations of resistances and capacitors.

The return electrode may be the body of the apparatus or connected to the body of the apparatus.

The second guard electrode may substantially surround the first guard electrode except for an open face on an external surface of the apparatus.

The electrical source may be an alternating current (AC) voltage source that produces an AC voltage waveform with a frequency greater than about 100 kHz, such as 1 MHz or 10 MHz.

The apparatus may be a logging-while-drilling (LWD) apparatus and/or other apparatus conveyed on a drill string and/or other means of conveyance.

The apparatus may be used in oil-based drilling fluid, water-based drilling fluid, and/or other drilling fluids.

The present disclosure also introduces a method comprising: conveying a downhole formation resistivity measurement tool within a wellbore that extends into a subterranean formation, wherein the downhole formation resistivity measurement tool comprises a probe that comprises: a button electrode; a first guard electrode insulated from the button electrode; a second guard electrode insulated from the button and first guard electrodes, wherein the second guard electrode surrounds the button electrode; a return electrode positioned external to the second guard electrode; an electrical source for setting a voltage drop between the second guard electrode and the return electrode; a first impedance (RBOG) electrically coupled between the button electrode and the second guard electrode; and a second impedance (RIGOG) electrically coupled between the first guard electrode and the second guard electrode; applying a voltage between the second guard electrode and the return electrode via the electrical source; measuring a current circulating through at least one of the first and second impedances; and determining a resistivity of the subterranean formation based on the measured current. The first and second impedances may be selected to minimize a voltage difference between the button electrode and the first guard electrode.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus operable for downhole measurement of a formation resistivity, comprising:
    a button electrode;
    a first guard electrode insulated from the button electrode;
    a second guard electrode insulated from the button and first guard electrodes; and a return electrode positioned external to the second guard electrode;

wherein at least the second guard electrode surrounds the button electrode; and wherein the apparatus further comprises:

an electrical source for setting a voltage drop between the second guard electrode and the return electrode;

a first impedance ($R_{BOG}$) electrically coupled between the button electrode and the second guard electrode; and a second impedance ($R_{IGOG}$) electrically coupled between the first guard electrode and the second guard electrode.

2. The apparatus according to claim 1, wherein the first and second guard electrodes are concentrically surrounding the button electrode.

3. The apparatus according to claim 2, wherein the first guard electrode is an inner guard electrode and the second guard electrode is an outer guard electrode.

4. The apparatus according to claim 1, wherein the first and second impedances are selected to minimize a voltage difference between the button electrode and the first guard electrode.

5. The apparatus according to claim 1, wherein the button electrode, the first guard electrode, the second guard electrode, and the return electrode are positioned on a common external surface of the apparatus.

6. The apparatus according to claim 1, wherein a ratio of values of the first and second impedances is selected so that $(R_{BOG}/R_{IGOG}) \approx (S_{IG}/S_B)$, wherein $S_{IG}$ and $S_B$ are respective external surface areas of the first guard and button electrodes.

7. The apparatus according to claim 6, wherein the variable impedance is the second impedance.

8. The apparatus according to claim 1, wherein at least one of the first and second impedances is a variable impedance, and wherein the apparatus further comprises:

at least one sensor for measuring an electrical parameter relative to the button electrode and/or the first guard electrode; and a controller for setting the value of the variable impedance based on the measured electrical parameter.

9. The apparatus according to the claim 8, wherein the electrical parameter comprises at least one of:

the voltage drop between the button electrode and first guard electrode; and currents circulating between the button electrode and a reference electrode and between the first guard electrode and the reference electrode, the reference electrode being one of the second guard electrode and the return electrode.

10. The apparatus according to claim 1, wherein the first and second impedance are resistances.

11. The apparatus according to claim 1, wherein the second guard electrode substantially surrounds the first guard electrode except for an open face on an external surface of the apparatus.

12. The apparatus according to claim 1, wherein the apparatus is a logging-while-drilling (LWD) apparatus conveyed on a drill string.

13. The apparatus according to claim 1, wherein the apparatus is used in oil-based drilling fluid.

14. A method, comprising:

conveying a downhole formation resistivity measurement tool within a wellbore that extends into a subterranean formation, wherein the downhole formation resistivity measurement tool comprises a probe that comprises:

a button electrode;

a first guard electrode insulated from the button electrode;

a second guard electrode insulated from the button and first guard electrodes, wherein the second guard electrode surrounds the button electrode;

a return electrode positioned external to the second guard electrode;

an electrical source for setting a voltage drop between the second guard electrode and the return electrode;

a first impedance ($R_{BOG}$) electrically coupled between the button electrode and the second guard electrode; and a second impedance ($R_{IGOG}$) electrically coupled between the first guard electrode and the second guard electrode;

applying a voltage between the second guard electrode and the return electrode via the electrical source;

measuring a current circulating through at least one of the first and second impedances; and determining a resistivity of the subterranean formation based on the measured current.

15. The method of claim 14, wherein the first and second impedances are selected to minimize a voltage difference between the button electrode and the first guard electrode.

* * * * *